No. 716,967. Patented Dec. 30, 1902.
J. G. & A. WANGERIN.
FASTENING MEANS FOR BINDER APRONS.
(Application filed Oct. 18, 1902.)
(No Model.) 3 Sheets—Sheet 1.
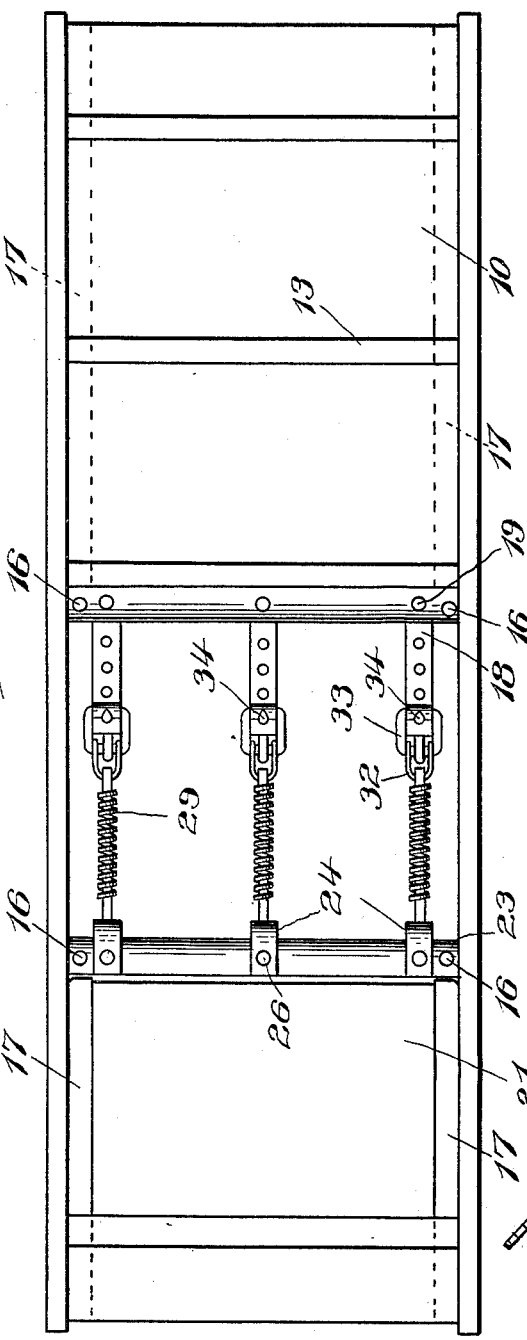
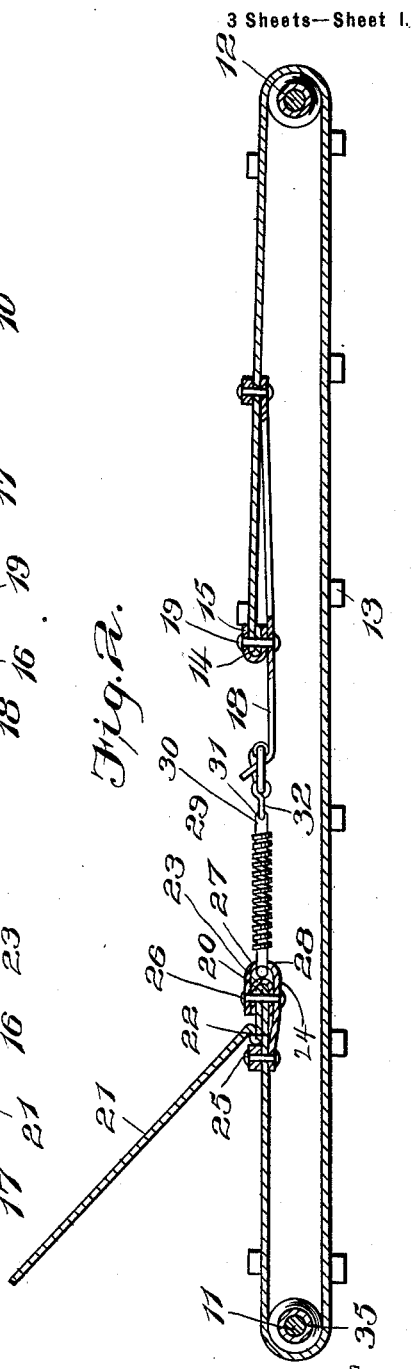
Witnesses
T. P. Britt
Inventors
J. G. Wangerin
A. Wangerin
By Chandler & Chandler
Attorneys No. 716,967. Patented Dec. 30, 1902.
J. G. & A. WANGERIN.
FASTENING MEANS FOR BINDER APRONS.
(Application filed Oct. 18, 1902.)

(No Model.) 3 Sheets—Sheet 2.

Witnesses
T. P. Britt

Inventors
J. G. Wangerin
A. Wangerin
By Chandler & Chandler
Attorneys

THE NORRIS PETERS CO., PHOTO-LITHO., WASHINGTON, D. C.

No. 716,967. Patented Dec. 30, 1902.
J. G. & A. WANGERIN.
FASTENING MEANS FOR BINDER APRONS.
(Application filed Oct. 18, 1902.)
(No Model.) 3 Sheets—Sheet 3.
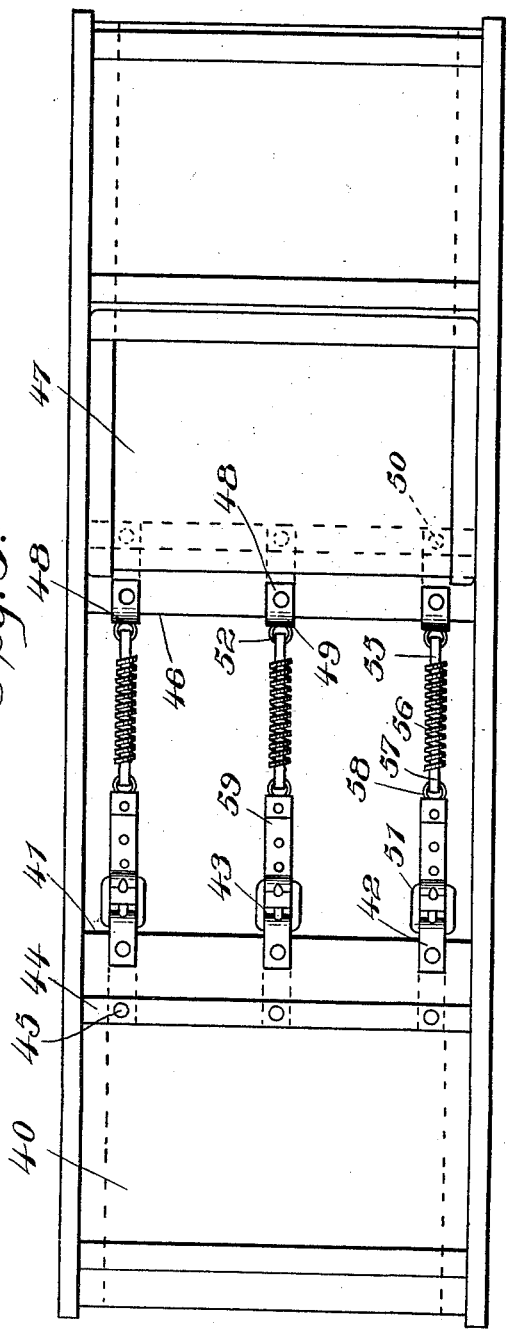
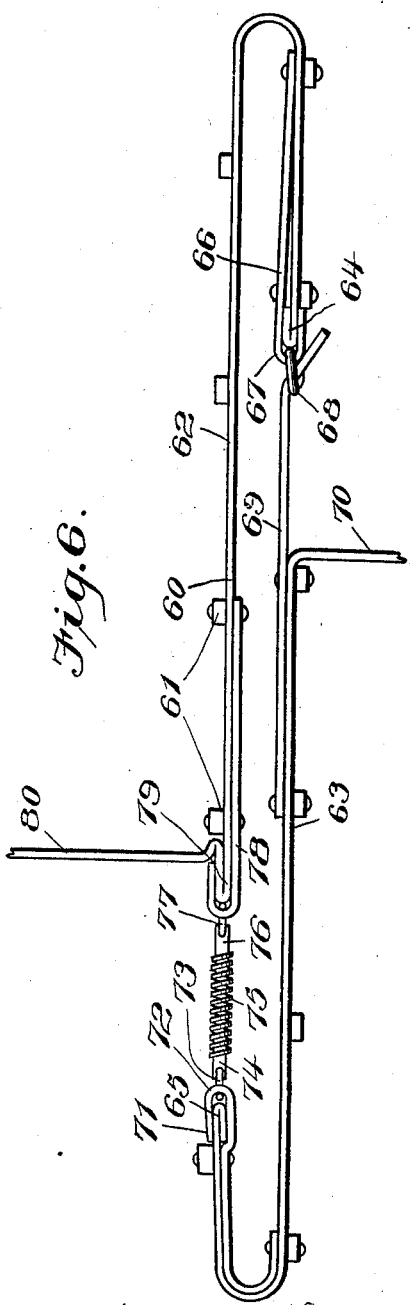
Witnesses
Inventors
J. G. Wangerin
A. Wangerin
By
Attorneys

UNITED STATES PATENT OFFICE.

JOHN G. WANGERIN AND AUGUST WANGERIN, OF SPRINGFIELD, MINNESOTA.

FASTENING MEANS FOR BINDER-APRONS.

SPECIFICATION forming part of Letters Patent No. 716,967, dated December 30, 1902.

Application filed October 18, 1902. Serial No. 127,851. (No model.)

*To all whom it may concern:*

Be it known that we, JOHN G. WANGERIN and AUGUST WANGERIN, citizens of the United States, residing at Springfield, in the county of Brown, State of Minnesota, have invented certain new and useful Improvements in Fastening Means for Binder-Aprons; and we do hereby declare the following to be a full, clear, and exact description of the invention, such as will enable others skilled in the art to which it appertains to make and use the same.

This invention relates to means for fastening the ends of binder-aprons; and it has for its object to provide a construction wherein the ends will be held together yieldably to maintain practically constant tension of the belt as the latter shrinks and expands under working conditions. By this means the pressure between the bearing-surfaces is even, the friction is practically constant, and the parts are not subjected to the excessive wear that would otherwise be present.

A further object of the invention is to provide a construction wherein the several parts may be easily and quickly connected and disconnected, permitting of rapid application and removal of the apron, and facilitating the substitution of new parts for those that have become worn.

Other objects and advantages of the invention will be understood from the following description and include the provision of an apron wherein that end which has the covering-flap is provided with a transverse plait to which the attaching means at one end of the belt are attached.

Figure 4:
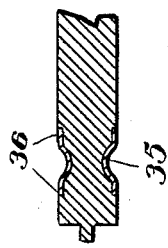
Figure 8:
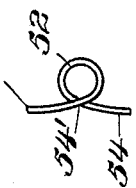
Figure 9:
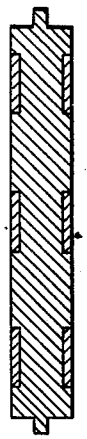
Figure 3:
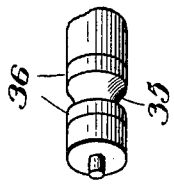
Figure 7:

In the drawings forming a portion of this specification, and in which like numerals of reference indicate similar parts in the several views, Figure 1 is a top plan view showing an apron connected in accordance with one embodiment of the present invention, the flap being raised. Fig. 2 is a vertical section taken longitudinally through the apron and transversely through the rollers on which it is mounted. Fig. 3 is a perspective view showing one grooved portion of a supporting-roller. Fig. 4 is a longitudinal section through a portion of the supporting-roller. Fig. 5 is a top plan view of an apron having a different form and arrangement of fastening means. Fig. 6 is a side elevation showing an apron formed in two sections and connected at one end by springs and the other end by straps. Fig. 7 is a detail perspective view of a form of connection between a spring and a strap. Fig. 8 is a plan view showing a different form of connection between a spring and a strap. Fig. 9 is a longitudinal section through a different form of supporting-roller.

Referring now to the drawings, there is shown an apron 10, of canvas or other suitable material, which is mounted for movement upon rollers 11 and 12, said apron having the usual transverse slats 13 for the well-known purpose. At one end of the apron is formed a hem 14, upon which is secured a metallic binding 15, held in place by means of rivets 16 passed therethrough and through the hem 14 and the side hems 17. Upon the face of the metallic binding are disposed straps 18, which are held in place by means of rivets 19, passed therethrough and through the binding, said straps having perforations therein to receive the tongues of buckles, as hereinafter described. The opposite end of the apron is folded upon itself to form the plait 20 and the covering-flap 21, the flap being laid upon the plait and a line of stitching 22 being passed through the three thicknesses, as shown. Upon the plait 20 is secured a metallic binding 23, and against the opposite faces of this binding are secured the end portions of straps 24, which are bent upon themselves. One end portion of each strap 24 is longer than the other end portion and extends along the inner face of the apron to the first transverse slat, and through the slat, the apron, and the said end portion of the strap is passed a rivet 25. Other rivets 26 are passed through both folds of the straps and through the metallic binding. Through the bight portion 27 of each of the straps 24 is an opening 28, through which is passed the stem of a T-shaped link, the transverse head of which is held between the folds of the strap, said link being made of soft metal, so that it may be screwed into the end of a helical spring 29, which will cut a thread on the stem to hold the stem and spring together. At the opposite end of each of the springs 29 is a soft-metal link 30 in the form of a plug, which is screwed into the end of the spring and has an eye 31 at its outer end to receive a yoke 32, the ends of which are engaged with a buckle 33, which is adapted to receive the corresponding strap 18 and has a tongue 34 for engagement therewith. With this construction it will be seen that there is provided a yieldable coupling between the ends of the apron, which permits of separation of the ends of the apron as the apron contracts, as when subjected to dew or rain, said springs taking up the slack of the apron when the latter stretches. To permit of easy passage of the springs around the rollers, said rollers are grooved and at their grooved portions are provided with metallic casings or jackets 35, which are grooved on their outer faces circumferentially and have corresponding inner flanges 36, which engage and form linings for the grooves of the rollers. When the springs reach the rollers in their travel with the apron, they enter the grooves and pass in them around the rollers, as will be understood.

Referring now to Fig. 5 of the drawings, there is shown an embodiment of the invention wherein one end of the apron 40 is provided with a terminal hem 41 and to the upper and lower faces of which are secured the ends of straps 42, which are folded upon themselves to form the bights 43, the ends of the straps at the inner side of the apron being continued beyond the hem to the first transverse slat 44, there being rivets 45 passed through the straps and the hem and through the straps, the apron, and the transverse slat. The opposite end of the apron is folded to form a plait 46 and a flap 47, corresponding to the plait 20 and flap 21, and against the inner and outer faces of the plait are disposed the ends, respectively, of straps 48, which are folded each upon itself to form a bight portion 49, the end portions of the straps at the inner side of the apron being continued beyond the plait to the first transverse slat, to which they are connected by means of rivets 50, passed through the straps, the apron, and slat. Within the bight portion of each of the straps 42 is held the rear side of the frame of a buckle 51, said bights being perforated to permit of passage of the tongues of the buckles therethrough. Within the bight portion of each of the straps 48 are received the end portions of a wire loop 52, the wire of which it is formed being crossed and continued beyond the point of crossing to form the arms 53, and the reduced neck 54, the arms lying within the bight of the strap, with the neck 54 in the perforation of the bight and the eye extending exteriorly of the strap and engaged through the eye at one end of the plug-like link 55, of soft metal, which is screwed into the adjacent end of a helical spring 56. At the opposite end of each of the helical springs is engaged a similar link 57, having an eye with which is engaged the eye 58 of a loop similar to the loop which is engaged with the link at the opposite end of the spring, the arms of each of these second loops being engaged in the bight portion of a strap 59, which is perforated for engagement with the corresponding buckle at the opposite end of the apron. It will be noted that the straps 59 after being bent upon themselves to form the bight portions referred to are riveted.

In Fig. 6 of the drawings there is shown a construction wherein the apron 60 is formed in two sections 62 and 63, both having the usual transverse slats 61 and each having at one end a hem 64 and 65, respectively. Against the faces of the hem 64 are riveted the end portions of straps 66, which are bent or folded to form bights 67, that are engaged with buckles 68, the straps at the inner sides of the apron being continued beyond the hem to the second slat and having rivets passed through it and the first and second slats. At the opposite end of the section 63 from its hem 65 and against the inner face of the apron are secured straps 69, which are held in place by rivets passed through the straps, the apron, and two of the slats, the apron being continued beyond the endmost strap to form a flap 70, which is adapted to cover the ends of the straps 69 and the buckles 68, with which they engage when the apron is in operation. Against the faces of the hem 65 are riveted the end portions of straps 71, which are folded to form bights 72, having openings therethrough, and with which bight portions are engaged the arms of wire loops 73, similar to those above described, the eyes of the loops extending through the openings in the bights and engaged in the eyes at the ends of links 74, of soft metal, which are screwed into the ends of helical springs 75, having also links 76 screwed into their opposite ends and engaged with wire loops 77, engaged in the bights of straps 78, which are secured against the opposite faces of the hem 79 of the section 62, beyond which extends the flap 80 for covering the connected parts.

With the last-described construction the slack is taken up at a point distant from the springs, it being understood that the apron may be made of any convenient number of sections.

In Fig. 9 of the drawings there is shown a roller having the metal bands without grooves and which arrangement may be substituted for the grooved bands.

In practice either the wire loops in connection with the cylindrical links may be used, or, if preferred, the T-shaped links, it being understood that other modifications may be made and that any suitable materials and proportions may be used for the various parts without departing from the spirit of the invention.

It will be noted that in the present construction the helical springs may be readily disengaged from the links and that the links of the wire loops may be easily disengaged from the straps, the whole structure being readily disassembled.

What is claimed is—

1. A conveyer-apron having one end portion plaited on the transverse line distant from one end, said end portion being folded upon the plait, a line of stitching passed through the resultant three thicknesses of material, and fastening devices attached to the plait, said end portion forming a flap to cover the fastening devices.

2. A conveyer-apron having its end portions doubled upon themselves and provided with metallic bindings, and fastening devices for the ends of the apron attached to the metal bindings.

3. An apron for binders having yieldable fastening means for connecting its ends, and means for simultaneously adjusting the tension of the yieldable means and the spacing of the ends of the apron.

4. A conveyer-apron having looped straps attached to one end, T-shaped links having their head portions engaged in the loops of the straps, helical springs engaged with the ends of the links, and an adjustable connection between springs and the opposite end of the apron.

5. A conveyer-apron having looped straps attached to one end, links removably engaged in loops of the straps, helical springs removably engaged with the links, links removably engaged with the opposite ends of the springs and having eyes, buckles having bails engaged through the said eyes, and straps attached to the opposite end of the apron and adapted for engagement with the buckles.

6. A conveyer-apron comprising rollers having circumferential grooves, bands disposed upon the rollers and corrugated circumferentially into the grooves of the rollers, and an apron mounted upon the rollers and having fastening means at its ends disposed to engage the corrugations of the bands.

In testimony whereof we affix our signatures in presence of two witnesses.

JOHN G. WANGERIN.
AUGUST WANGERIN.

Witnesses:
L. H. REDETZKE,
C. S. PETERSEN.